(12) United States Patent
He et al.

(10) Patent No.: US 8,666,218 B2
(45) Date of Patent: Mar. 4, 2014

(54) COMPACT THERMAL ACTUATED VARIABLE OPTICAL ATTENUATOR

(75) Inventors: Yi He, Winchester, MA (US); Luzhong Yin, Woburn, MA (US); Guixiong Zhong, Billerica, MA (US); Jun Yan, Reading, MA (US); Jing Zhao, Winchester, MA (US)

(73) Assignee: Agiltron, Inc., Woburn, MA (US)

( * ) Notice: Subject to any disclaimer, the term of this patent is extended or adjusted under 35 U.S.C. 154(b) by 0 days.

(21) Appl. No.: 12/715,914

(22) Filed: Mar. 2, 2010

(65) Prior Publication Data

US 2011/0217018 A1    Sep. 8, 2011

(51) Int. Cl.
   *G02B 6/00*    (2006.01)
(52) U.S. Cl.
   USPC .......................................................... 385/140
(58) Field of Classification Search
   USPC .......................................................... 385/140
   See application file for complete search history.

(56) References Cited

U.S. PATENT DOCUMENTS

| | | | |
|---|---|---|---|
| 5,506,919 A | 4/1996 | Roberts | |
| 5,909,078 A | 6/1999 | Wood et al. | |
| 5,994,816 A | 11/1999 | Dhuler et al. | |
| 6,167,185 A * | 12/2000 | Smiley et al. | 385/140 |
| 6,173,105 B1 | 1/2001 | Aksyuk et al. | |
| 6,246,826 B1 * | 6/2001 | O'Keefe et al. | 385/140 |
| 6,268,952 B1 | 7/2001 | Godil et al. | |
| 6,275,320 B1 | 8/2001 | Dhuler et al. | |
| 6,465,929 B1 * | 10/2002 | Levitan et al. | 310/309 |
| 6,675,578 B1 * | 1/2004 | Sinclair | 60/528 |
| 6,707,981 B2 * | 3/2004 | He | 385/140 |
| 6,775,459 B2 | 8/2004 | Hong et al. | |
| 6,816,295 B2 | 11/2004 | Lee et al. | |
| 6,838,738 B1 | 1/2005 | Costello et al. | |
| 6,853,765 B1 | 2/2005 | Cochran | |
| 6,901,204 B2 | 5/2005 | Hong et al. | |
| 6,980,727 B1 | 12/2005 | Lin et al. | |
| 6,982,515 B2 * | 1/2006 | Howell et al. | 310/307 |
| 7,007,471 B2 * | 3/2006 | Sinclair | 60/527 |
| 7,113,689 B2 | 9/2006 | Hong et al. | |
| 7,242,825 B2 | 7/2007 | Lin et al. | |
| 7,298,954 B2 | 11/2007 | Liu et al. | |

(Continued)

OTHER PUBLICATIONS

Isamoto, K. et al. A 5-V Operated MEMS Variable Optical Attenuator by SOI Bulk Micromachining. IEEE J. Sel. Topics Quant. Elect. 10(3) May/Jun. 2004: 570-578.

(Continued)

*Primary Examiner* — Uyen Chau N Le
*Assistant Examiner* — Chris Chu
(74) *Attorney, Agent, or Firm* — Burns & Levinson LLP; Jacob N. Erlich; Orlando Lopez

(57) ABSTRACT

A MEMS variable optical attenuator (VOA) chip includes a frame having a planar surface, a micro-electric actuator with a movable optical shutter arranged with respect to the planar surface of the frame, where the VOA is actuated by thermal expansion. The micro-electric actuator comprises semiconductor conductors ("wires") that can be moved, upon applying an electrical current, by thermal expansion. In one embodiment, the MEMS VOA chip is configured in a multiple wire arrangement that restricts the shutter movement in a plane.

4 Claims, 9 Drawing Sheets

(56) References Cited

U.S. PATENT DOCUMENTS

| | | | |
|---|---|---|---|
| 7,346,240 B1 | | 3/2008 | He et al. |
| 7,567,011 B1* | | 7/2009 | Jean et al. ............... 310/306 |
| 2002/0113281 A1* | | 8/2002 | Cunningham et al. ........ 257/415 |
| 2003/0021512 A1* | | 1/2003 | Guerin et al. ............... 385/10 |
| 2003/0156817 A1* | | 8/2003 | He ............... 385/140 |
| 2004/0126081 A1* | | 7/2004 | Hong et al. ............... 385/140 |
| 2004/0136680 A1* | | 7/2004 | Medina et al. ............... 385/140 |
| 2004/0190818 A1* | | 9/2004 | Telkamp et al. ............... 385/22 |
| 2004/0229440 A1 | | 11/2004 | Kim et al. |
| 2005/0047721 A1* | | 3/2005 | Chen et al. ............... 385/40 |
| 2005/0264131 A1* | | 12/2005 | Hong ............... 310/309 |
| 2006/0127029 A1* | | 6/2006 | Lin et al. ............... 385/140 |
| 2008/0205845 A1* | | 8/2008 | Wang et al. ............... 385/140 |
| 2011/0102875 A1* | | 5/2011 | Yang et al. ............... 359/221.2 |

OTHER PUBLICATIONS

Que, Long, et al., "Bent-beam electrothermal actuators—part I: single beam and cascaded devices," Journal of Microelectromechanical Systems, vol. 10, No. 2, Jun. 2001.

Van Exter, M. et al., Optical and electronic properties of doped silicon from 0.1 to 2 THz, Appl. Phys. Lett., 56 (17), Apr. 23, 1990, pp. 1694-1696.

Asheghia, M. et al., Thermal conduction in doped single-crystal silicon films, Jornal of Applied Physics, vol. 91, No. 8, Apr. 15, 2002.

Wolfram Demonstrations Project: "Doped Silicon Semiconductors" available at http://demonstrations.wolfram.com/DopedSiliconSemiconductors/, (c) 2012 Wolfram Demonstrations Project & Contributors.

Translation of the First Office Action dated Dec. 31, 2012 of Chinese Patent Application No. 201010501269.0.

* cited by examiner

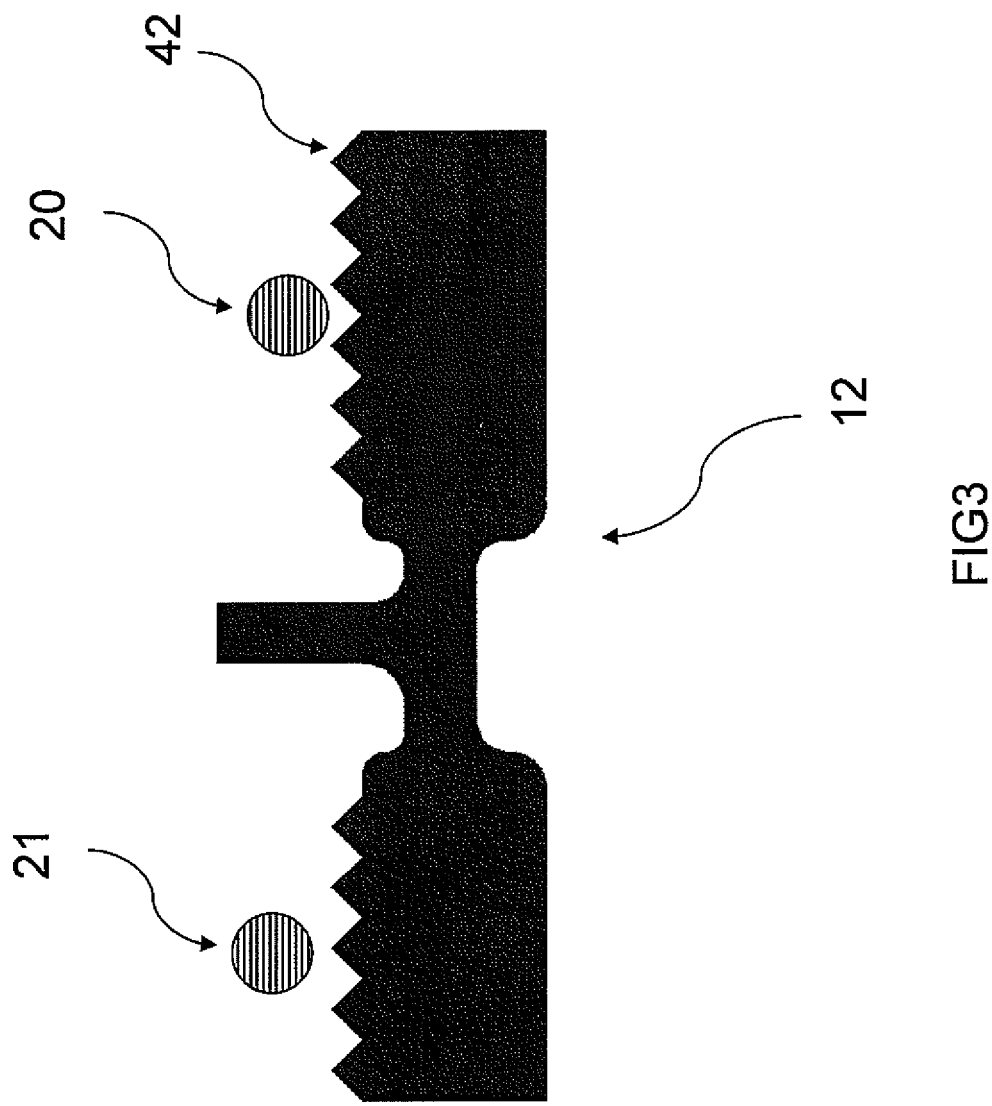

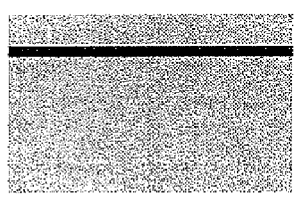
(a) Start from SOI
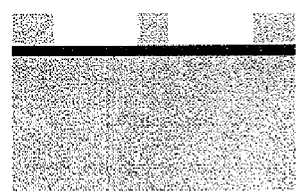
(b) Device pattern
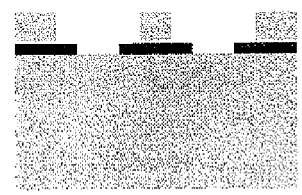
(c) Box pattern
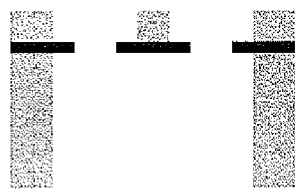
(d) Backside etch
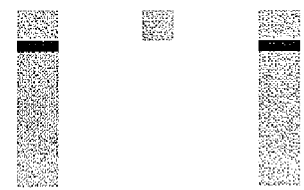
(e) Box strip
Si    SiO2
Figures 7a-7e Process flow

COMPACT THERMAL ACTUATED VARIABLE OPTICAL ATTENUATOR

BACKGROUND

A variable optical attenuator (VOA) is an electro-optical component capable of attenuating an optical power by a varied amount of attenuation based on a user's requirements by applying an electrical control signal. Variable optical attenuators are widely used to control or regulate optical power levels in optical telecommunication systems. For example, an optical attenuator is needed in optical telecommunication network laser sources to regulate an output optical power. In an other example, an optical attenuator is needed in laser detector when an optical signal with an excessive power level, that is, greater than a predetermined power level, is received. In a further example, an optical attenuator is needed to balance the optical power level among multiple channels in the EDFA (Erbium-Doped Fiber Amplifier) module.

Variable optical attenuators have been produced by various methods, including electro-optical polarization rotation, waveguide index change, bulk mechanical and micro-mechanical light beam blocking or steering. Among MEMS VOAs, electro-static based devices are a most common approach. However, their need for a high electrical field to generate sufficient actuation force results in the requirement of costly hermetic packaging. Electro-thermal actuation is also used in VOAs. Nevertheless, these devices are large in size, the response time for thermal structures is relatively slow, and the device's thermal control is a significant challenge for the packaging design. Previous designs that use electro-magnetic force have eliminated the need for the expensive hermetic packaging, but they need external magnets. Also, VOAs made by these designs are subject to drift of both time and background temperature dependence which prevents them to be used in general applications.

Because the attenuation of the optical signal is highly sensitive to the position of the beam blocking or steering mechanism, any change of the device characteristics with time and background temperature, for example, material Young's modulus, resistance, thermal expansion mismatch between different layers, will introduce drift to the attenuation signal. Further the conventional MEMS variable optical attenuators have a substantial disadvantage of signal drift and undesirably large size.

Therefore, the market needs an improved MEMS VOA design that is small in size, low in drift, and easy to manufacture.

BRIEF SUMMARY

The present teachings overcome the above problems by providing an optical attenuator that uses an element of a micro-electro-mechanical system (MEMS) device, and more particularly a MEMS variable optical attenuator (VOA) chip having an improved optical shutter for regulating the optical power of an optical signal by partially intercepting incident light beams. An embodiment incorporates a MEMS variable optical attenuator with a compensated optical shutter structure which has the characteristics of self-compensation, thereby preventing the shutter position, thus the attenuation level, to change with time as well as environmental variations.

In one embodiment of these teachings, the variable optical attenuator is produced at low cost with high reliability, little environmentally induced drift, and small size.

The present teachings further provide, in one embodiment, a MEMS variable optical attenuator with an optical shutter having a shape capable of gradually blocking light beam without polarization dependence.

Additionally, the present teachings provide MEMS variable optical attenuator with miniature size so that it can be integrated onto a fiber tip.

In accordance with one embodiment of the present teachings, the above and other provisions are accomplished by a MEMS variable optical attenuator comprising a frame having a planar surface, a micro-electric actuator that drives an optical shutter movable to block partially or totally light beam transmitting from sources of electromagnetic radiation such as, but not limited to, optical fibers.

The optical shutter may have, but is not limited to, a flat panel shape and, in one embodiment, is arranged to be oblique relative to the transmitting and or receiving optical ports such as, but not limited to, transmitting fiber end and/or the receiving fiber end of the optical pigtail.

The actuator includes at least two electrodes fixed onto the substrate, a group of movable conductors (hereinafter referred to as wires) anchored to these electrodes, and the optical shutter attached to the movable wires. Therefore, when a driving current passes through the movable wires, the optical shutter will gradually cover the light path.

The movable wires may have, but are not limited to, the same dimensions, resistance, and initial angle. The substrate may also be made of same material as the wires and is fixed onto the surface having the input/output optical port (for example, optical fiber pigtail surface). In one embodiment, when the wires are heated up by the driving current, the temperature difference between the wire and the substrate generates a stress that causes a portion of the wire to move along a defined direction. The optimized small size and light mass helps the chip to establish a temperature gradient in short time. The environmental temperature changes add the same influence to the wires and the substrate so that there is substantially no temperature difference. As a result, the structure compensates in all dimensions, leading to effectively unchanged shutter position.

In one embodiment, the angle height of the wire is substantially equal to the width of the wire, which has found to be most efficient in actuation.

In another embodiment, the wires have a narrower width at the ends and centers of the wires to decrease the effective width of the wire while increase stiffness of the wires.

In a further embodiment, the optical shutter has one or more triangle-shaped edges so that a gradual light blocking is achieved, leading to minimal polarization dependence.

In one embodiment, the MEMS fabrication steps are simplified by using only a few steps with a minimum number of masks using silicon on insulator (SOI) wafers.

For a better understanding of the present teachings, together with other and further needs thereof, reference is made to the accompanying drawings and detailed description and its scope will be pointed out in the appended claims.

BRIEF DESCRIPTION OF THE DRAWINGS

FIG. 1b illustrates another view of the embodiment of FIG. 1a;

FIGS. 2a, 2b illustrate details of the embodiments of the MEMS VOA of FIG. 1a;

FIG. 3 illustrates an optical shutter having triangular shaped edges located adjacent an optical beam to be blocked;

FIGS. 7a-7e are graphic illustrations of an embodiment of a process for manufacturing devices of these teachings.

DETAILED DESCRIPTION

A detailed description of a MEMS variable optical attenuator (VOA) in accordance with various embodiments of the present invention will be given below with reference to the accompanying drawings.

Figure 1A:
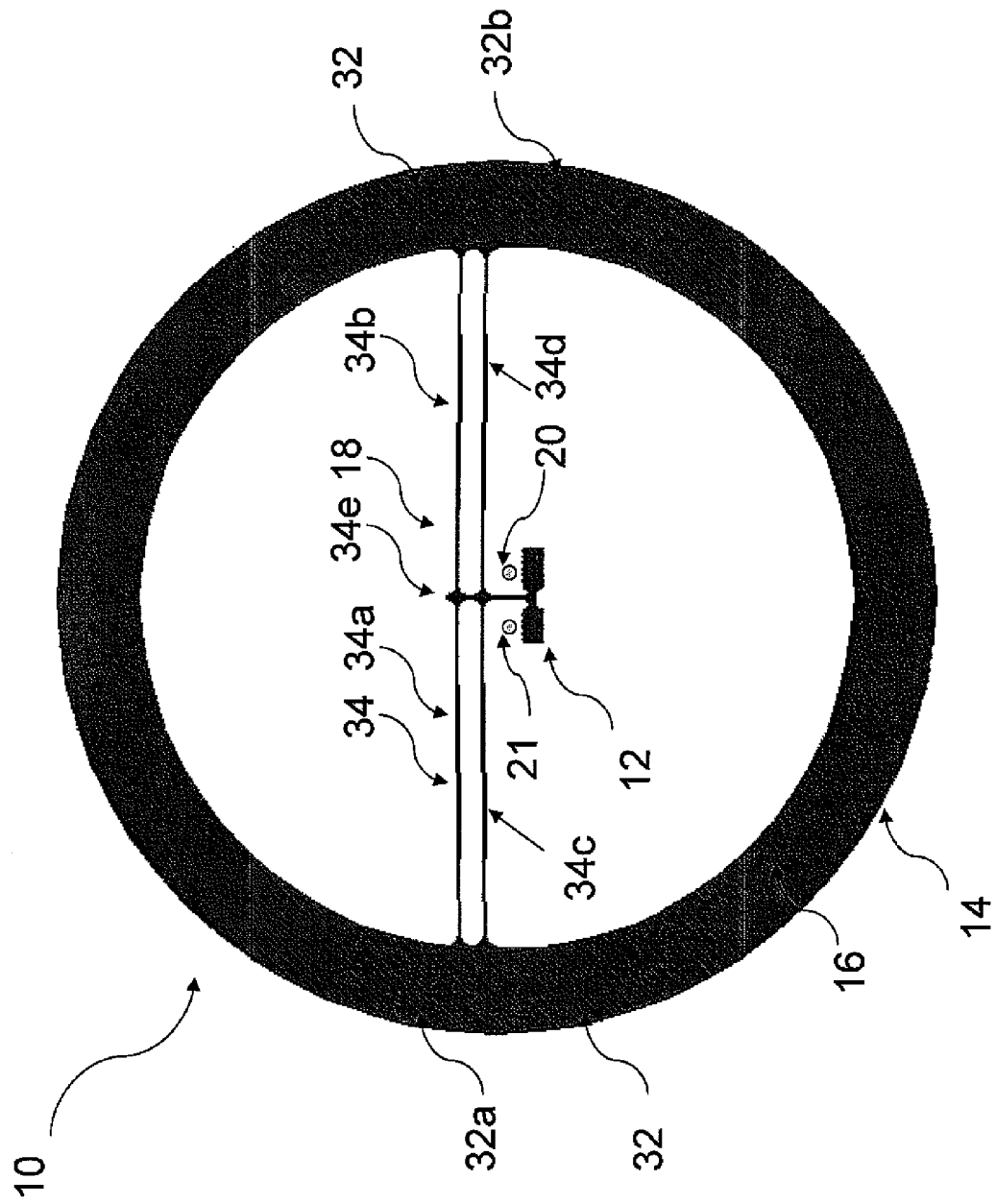
FIG. 1a illustrates an embodiment of a MEMS VOA chip of these teachings.

FIG. 1a illustrates a schematic view of an embodiment of a MEMS variable optical attenuator 10 in which an optical shutter 12 is utilized in accordance with one embodiment of these teachings.

Figure 1B:
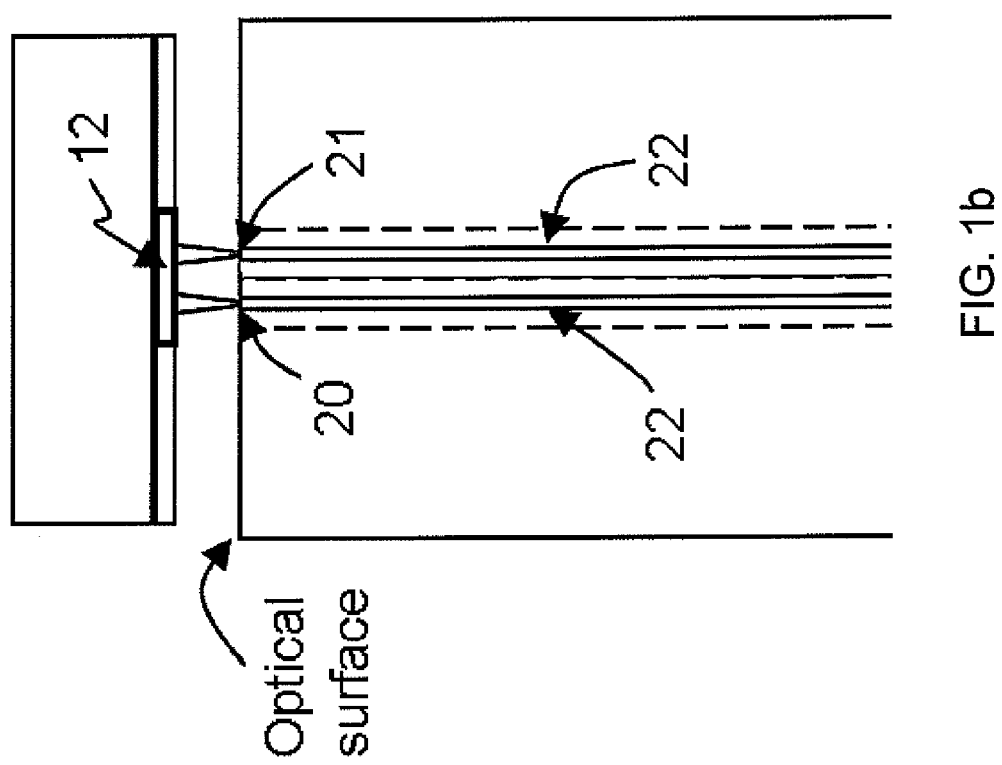

More specifically, the MEMS variable optical attenuator (VOA) or VOA chip 10 includes a substrate 14 (embodiments in which the VOA chip is lifted from the substrate are also within the scope of these teachings) having a planar surface frame 16, a micro-electric actuator 18 arranged on the planar surface 16 of the substrate 14, and optically aligned with each other while being arranged against the planar surface 16, an optical shutter 12 movable to a predetermined position over the receiving optical port 20 or the transmitting optical port 21 (in one instance, as shown in FIG. 1b, the optical ports 20, 21 connect to optical fibers 22) by the micro-electric actuator 18, thereby attenuating the partially transmitted light beams emanating/incoming from/to the optical ports 20, 21. It should be noted that the wires 34 shown in FIG. 1a are comprised of wire segments 34a, 34b (for the first wire), 34c, 34d (for the second wire). Connector (wire) segments 34a and 34b (for the first connector) are connected at one end (at a location) 34e; similarly, connector segments 34c and 34d (for the second connector) are also attached at one end. The optical shutter 12 is operatively attached to the first and second connector segments at the location where the first and second connector segments are connected (attached); similarly, the optical shutter is operatively attached to the connector segments for the second connector at the location where the connector segments for the second connector are connected.

The optical shutter 12 may have, but is not limited to, a flat panel shape and is arranged to be opaque relative to the transmitting port 21 and/or the receiving port 20 end.

Figure 2A:
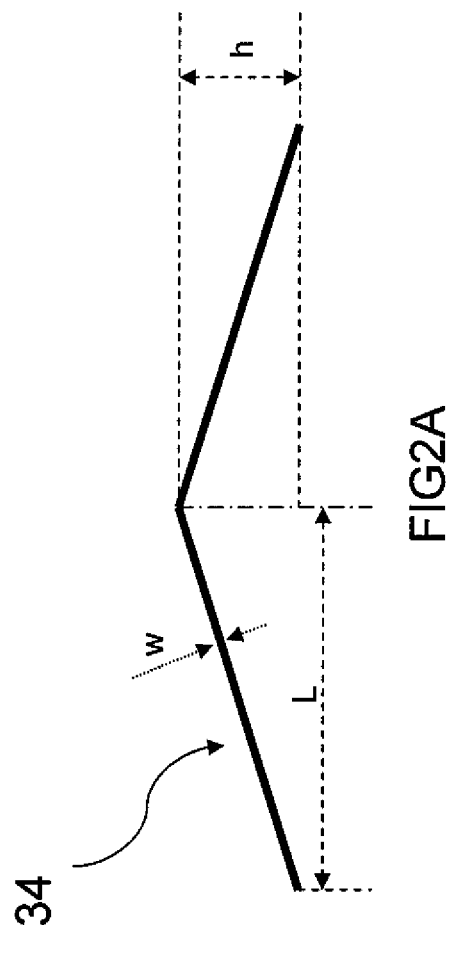
Figure 2B:
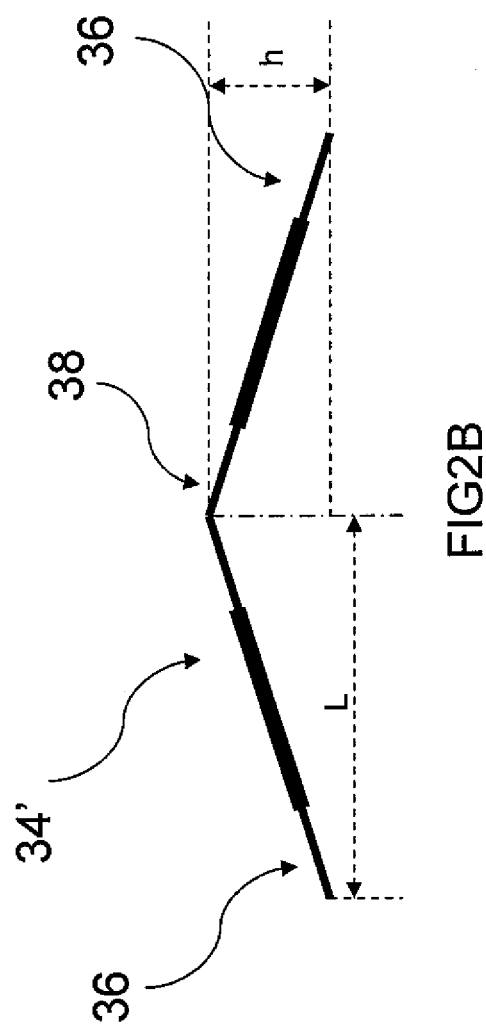

The actuator 18 includes at least two electrodes 32a, 32b fixed onto the substrate 14 and a group of movable wires 34 anchored to the electrodes 32a, 32b, and the optical shutter 12 is attached to the movable wires 34. It should be noted that a first end of the first wire segment 34a is fixedly attached to the first electrode 32a and a first end of the second wire segment 34b is fixedly attached to the second electrode 32b. The first wire segment 34a and the second wire segment 34b are disposed at an angle from a line connecting the first electrode 32a to the second electrode 32b, as shown in FIG. 2a. The first wire segment 34a and the second wire segment 34b are the two sides of a triangle. A second end of the first wire segment 34a is connected to a second end of the second wire segment 34b. Except at the point of connection to the electrodes, the first and second wire segments are moveable. The third and fourth wire segments 34c, 34d are arranged in the same manner and are disposed substantially parallel to the first and second wire segments 34a, 34b. (Since the angle at which the wire segments are disposed is very small, the angle can not be seen in FIG. 1a. However, a not to scale view is shown in FIGS. 2a, 2b, where the angle is explicitly shown.) Therefore, when a driving current passes through the movable wires 34, the optical shutter 12 will gradually cover the light path.

Figure 2C:
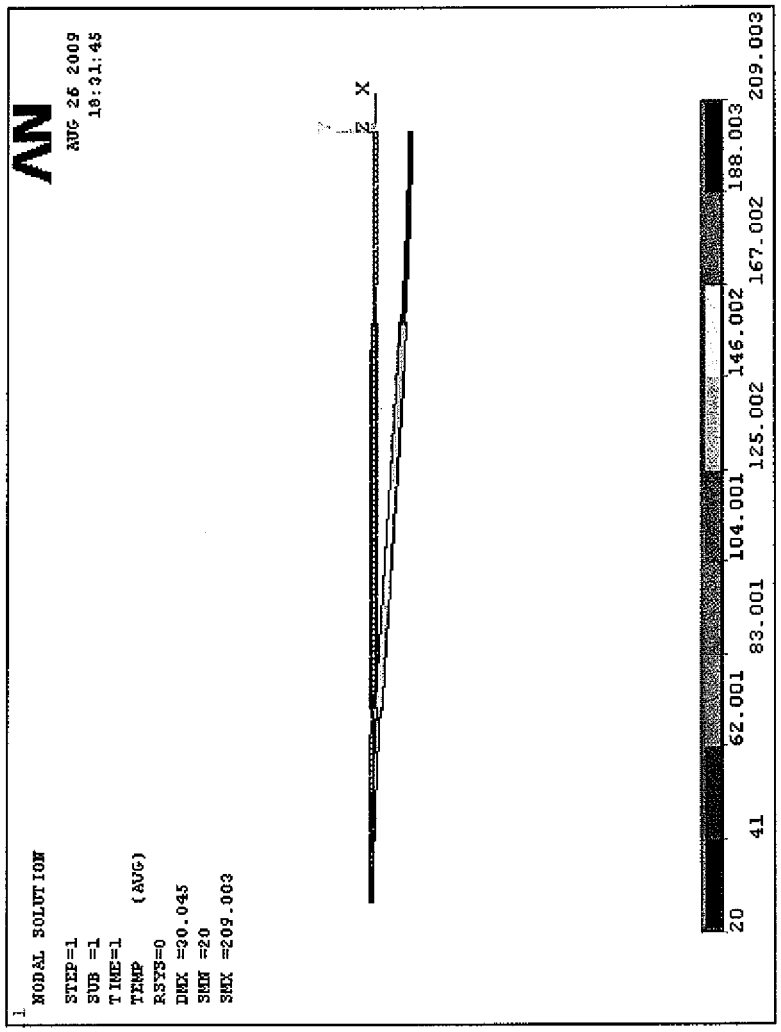
FIG. 2c graphically illustrates the displacement of one embodiment of an optical shutter of these teachings.

In one embodiment, the movable wires 34a, 34b (and/or 34c, 34d) have, but are not limited to, the same dimensions, resistance, and initial angle. The substrate 14 may also be made of the same material as the wires 34 and is fixed onto a surface having input/output optical ports 20, 21 (see FIG. 1b). In one instance, not a limitation of these teachings, the input/output optical ports include, for example, an optical fiber pigtail surface. Therefore, when the wires 34a, 34b, 34c, 34d are heated by the driving current, the temperature difference between the wires 34 and the substrate 14 generates a stress that causes the wires 34 to move along a defined direction, as shown in FIG. 2c. The optimized small size and thermal capacity enables the attenuator to establish a temperature gradient in short time. The environmental temperature changes add the same influence to the wires 34 and the substrate 14 so that there is substantially no temperature difference. As a result, the structure compensates in all dimensions, leading to effectively an unchanged position of shutter 12.

As shown in FIG. 1a, the movable wire group has multiple semiconductor wires 34. In one embodiment, all the wires 34 have substantially the same cross-section and length. (In one instance, as is shown FIGS. 7a-7e, the conductors and the planar surface are etched from the planar substrate so that the thermal expansion of the wires and the planar surface are substantially the same.) The wires 34 are electrically conductive so that they heat up upon applying a current.

In one instance, electric-thermal expansion induced motion amplification is achieved by using etched wires with an initial angle.

In one embodiment, a layer of a reflective or refractive material is deposited on one or more surfaces of the optical shutter 12. In one instance, the reflective or refractive material includes one or more materials such as Ti, Cr, Au, Pt, or glass.

In one instance, the optical shutter 12 is disposed between an optical receiving port and an optical emitting (transmitting) port. In that instance, in one embodiment, the reflective or refractive material is deposited on both the surface of the optical shutter facing the optical receiving port and the surface facing the optical emitting port.

In one embodiment, the wires 34 are formed from a material, such as doped silicon, selected to substantially optimize the required driving voltage (the voltage across the electrodes 32a and 32b) for the VOA.

Figure 1C:
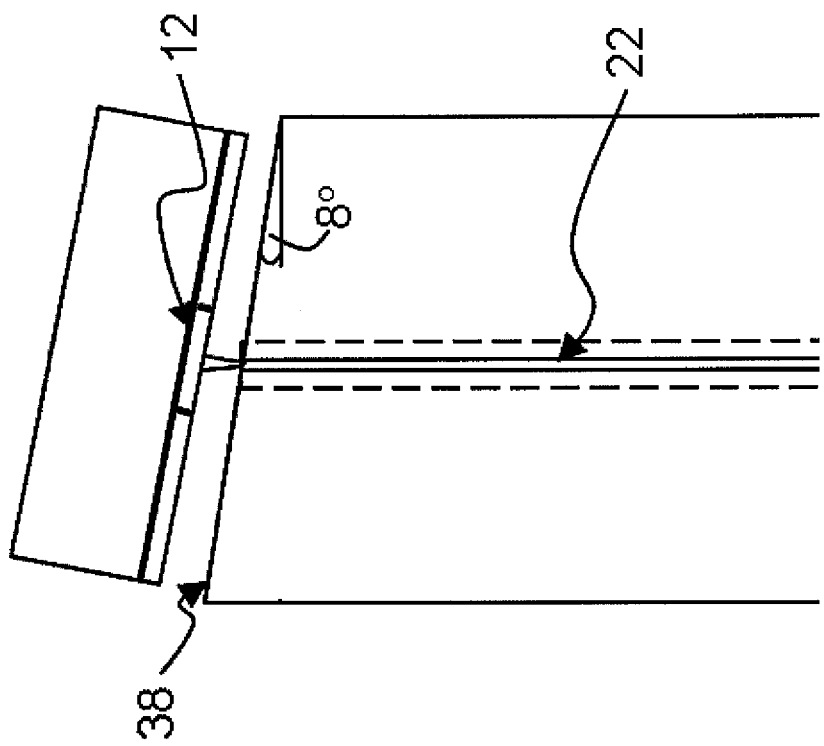
FIG. 1c illustrates a view of another instance of the embodiment of FIG. 1a in which the optical emitting/receiving surface is angled.

In one instance, as shown in FIG. 1c, the optical system having the receiving/emitting optical ports has an angled faceted end 38. In the embodiment shown in FIG. 1c, the optical shutter 12 is disposed substantially parallel to the angled faceted end 38 and is located obliquely (at an angle) with respect to an optical path axis of the electromagnetic radiation emitted/received from the emitting/receiving optical ports.

For such initial angled wires 34, as shown in FIG. 2a, the displacement under small deformation condition is given as $$d = \frac{h\alpha TL^2}{h^2 + W^2} \qquad (1)$$

where h is the angle height and W is width of the wire, L is half of the base length of wire 34, α is the thermal expansion coefficient of the wire 34 and T is the temperature increment on the wire 34. As can be seen from the above equation, the displacement has a maximum value of $\alpha TL^2/2W$ at h=W. When h=0, the amplifier displacement d will disappear. A small width of the wires 34 leads to large maximum displacement according to equation (1). In the embodiment in which the wires 34 have a substantially constant width W and the height of the triangle h is substantially equal to the width W, a substantially maximum displacement d of the point at which the wire segments 34a, 34b are connected is obtained.

Another shape of wire 34' is shown in FIG. 2b, where the wire 34' has a narrower width at the feet 36 and center 38 of the wires 34'. Such layout will decrease the effective width of the wire 34' while increase stiffness of the wire 34'. When the wires 34 or 34' are heated up by electric current, the thermal expansion drives the wires to bend in the defined direction according to Eqn. (1). The multi-wire structure shown in FIG. 1a restricts the movement in a plane. In one instance, to obtain substantially maximum displacement, due to symmetry, the shutter movement is substantially in the light blocking dimension.

As shown in FIG. 3, when a light beam(s) is incident onto the optical shutter 12 having triangular edges 42, the light blocking will be gradually introduced in both polarization directions, therefore the attenuation effect will have minimal polarization dependence. FIG. 3 also shows that the shutter 12 has a triangular (serrated) edge that is much longer than the diameter of the light beam.

Figure 4:
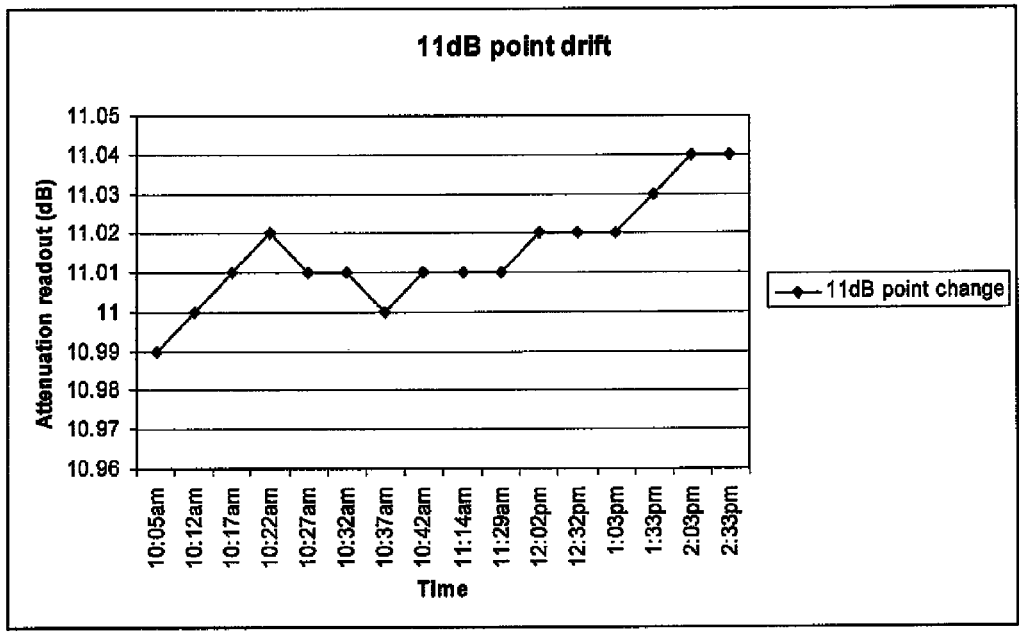
FIG. 4 graphically illustrates the drift performance with time for an embodiment of the VOA of these teachings.
Figure 5:
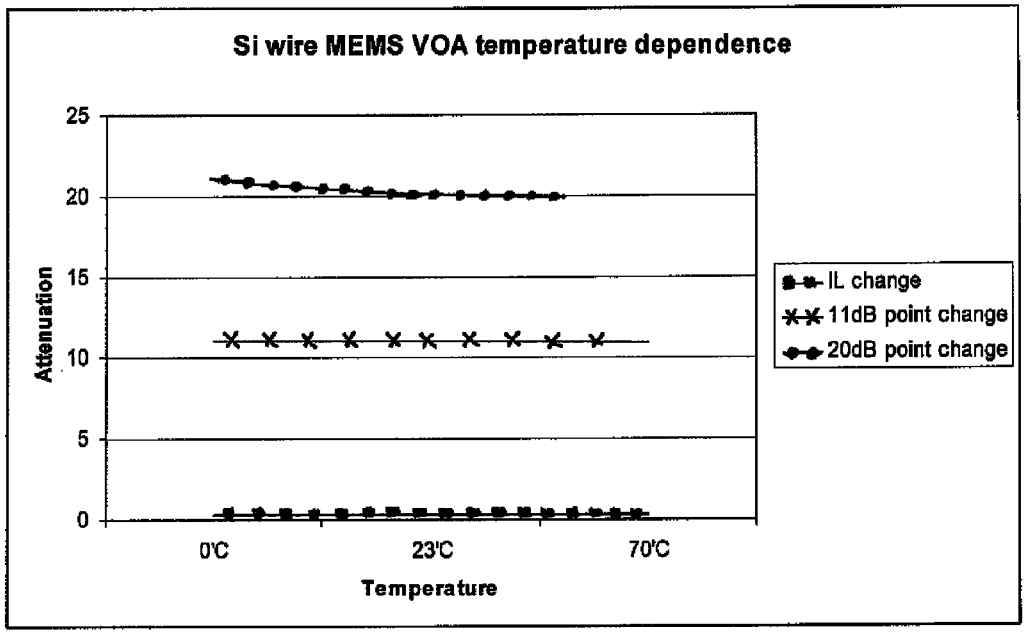
FIG. 5 graphically illustrates the temperature dependence of an embodiment of the VOA of these teachings.

FIG. 2c, FIG. 4, and FIG. 5 illustrates the compensated performance of the embodiment of the VOA chip. FIG. 2c shows: when a driving current is applied to the wires the optical shutter move in Y direction, which is the light blocking direction (as shown in FIG. 3). This behavior leads to a very minimal time drift, as shown in FIG. 4, approximately ≤0.05 dB at 11 dB attenuation for the duration of, for example, approximately 4 hours. The observed drift actually includes polarization dependence due to the non-polarization-maintaining optical fiber 22 (FIGS. 1b, 1c), and the drift reaches a stability distribution in minutes. Furthermore, the VOA also exhibits minimal environmental temperature dependence at approximately 11 dB±0.1 dB and 20 dB±0.5 dB when the environmental temperature changes from 0° C. to 70° C., as shown in FIG. 5.

In one embodiment, the MEMS fabrication steps are simplified by using silicon on insulator (SOI) wafers, where, in one instance, the device layer is a doped layer or a selectively doped layer. MEMS fabrication steps comprise only 5 steps: patterning the front and back sides, front-side deep reactive ion etching (DRIE), back-side DRIE, release of the buried oxide layer (box) oxide, and front-and-back metal depositions. This processing has the advantage that every step has a defined stop by the wafer structure; therefore the process control monitoring is drastically simplified. Specifically, the front-side DRIE will be stopped at the buried oxide layer, the back-side DRIE will also be stopped at the buried oxide layer, the oxide release will have minimal etch rate on the Si material, and metal deposition step (preferred a dry processing step) will have minimal impact to the released spring.

Figure 6:
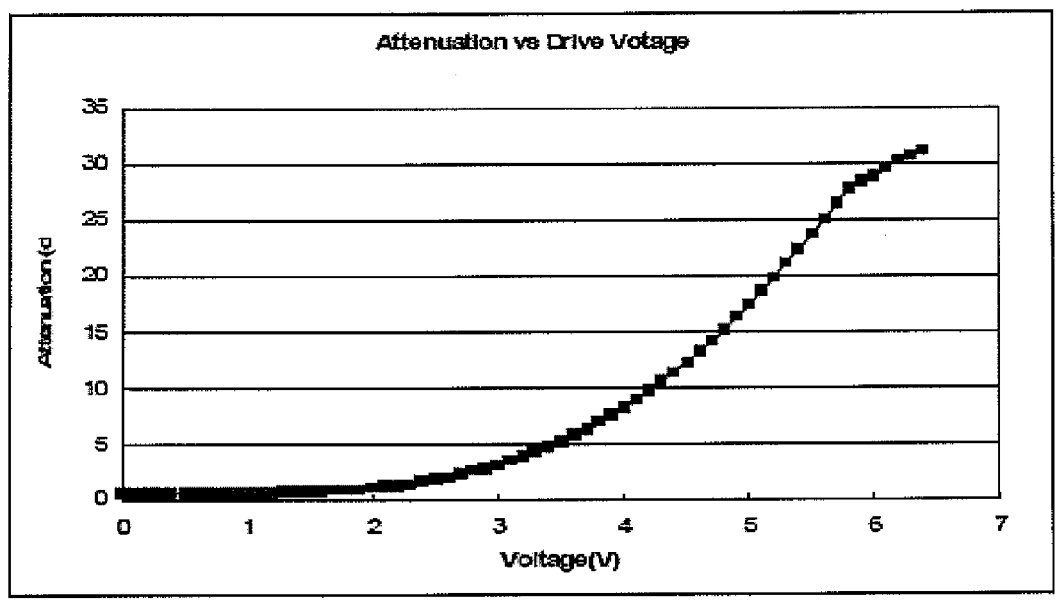
FIG. 6 graphically illustrates a VOA response to the electrical signal.

The process flow is shown in FIGS. 7a-7e. The process starts with (a) the SOI wafer substrate (FIG. 7a), proceeding to (b) device layer pattern (FIG. 7b), then (c) BOX layer pattern to protect the device (FIG. 7c), then (d) backside release etch (FIG. 7d) and, lastly (e) the remaining BOX is stripped away (FIG. 7e). The device electrically induced light attenuation function is shown in FIG. 6.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Although the teachings have been described with respect to various embodiments, it should be realized these teachings are also capable of a wide variety of further and other embodiments within the spirit and scope of the appended claims.

What is claimed is:

1. A variable optical attenuator comprising:
an optical shutter; said optical shutter having a plurality of external edges; at least one of said external edges having a jagged pattern including a plurality of points;
a frame surrounding an area in which said optical shutter is disposed; said frame comprising a first electrode and a second electrode;
a first conductor of predetermined width having a first end fixedly attached to said first electrode; said first conductor being disposed at an angle from a line connecting said first electrode and said second electrode; said first conductor being characterized by one thermal expansion coefficient;
a second conductor of predetermined width having a first end fixedly attached to said second electrode; said second conductor being disposed at an angle from a line connecting said first electrode and said second electrode; said first conductor and said second conductor being the two sides of a triangle; a second end of said first conductor being connected to a second end of said second conductor;
said angle of said first conductor and said angle of said second conductor defining a height;
said optical shutter being attached to said second end of said first conductor and said second end of said second conductor such that motion of said second end of the first conductor and said second end of the second conductor results in motion of said optical shutter;
said first and said second conductor having dimensions and characteristics such that said motion of said second end of the first conductor and said second end of the second conductor resulting from conduction of electrical current produces a substantially maximum displacement of said second end of the first conductor and said second end of the second conductor;
wherein the height, the predetermined width (W) of said first conductor and the predetermined width (W) of said second conductor are substantially equal to each other, and the substantially maximum displacement of said second end of the first conductor and said second end of the second conductor is equal to $$\alpha TL^2/2W$$

where
α is a coefficient of thermal expansion of the first conductor and the second conductor,
T is a temperature increment for the first conductor and the second conductor,
L is a one half of a base length of the first conductor and the second conductor, and
W is the predetermined width;
said material of said first and said second conductors being doped silicon; and said optical shutter being disposed over input/output optical ports.

2. The variable optical attenuator of claim 1 further comprising:
a third conductor having a first end fixedly attached to said first electrode; said third conductor being disposed at an angle from a line connecting said first electrode and said second electrode;
a fourth conductor having a first end fixedly attached to said second electrode; said fourth conductor being disposed at an angle from a line connecting said first electrode and said second electrode; said third conductor and said fourth conductor being the two sides of a
triangle; a second end of said third conductor being connected to a second end of said fourth conductor; said third conductor and said fourth conductor being substantially parallel to said first conductor and said second conductor;
said optical shutter attached to said second end of said third conductor and said second end of said fourth conductor; said second end of said third conductor and said second end of said fourth conductor being movable.

3. The variable optical attenuator of claim 1. wherein a surface of said optical shutter disposed over the input/output optical ports has a reflecting layer disposed thereon.

4. The variable optical attenuator of claim 1 wherein a surface of said optical shutter disposed over the input/output optical ports has a refracting layer disposed thereon.

* * * * *